(12) United States Patent
Gondek et al.

(10) Patent No.: US 9,800,764 B2
(45) Date of Patent: *Oct. 24, 2017

(54) PRINTER CARTRIDGE AND MEMORY DEVICE CONTAINING A COMPRESSED COLOR TABLE

(71) Applicant: HEWLETT-PACKARD DEVELOPMENT COMPANY, L.P., Houston, TX (US)

(72) Inventors: Jay S. Gondek, Camas, WA (US); Stephen J. Nichols, Vancouver, WA (US); Jefferson P. Ward, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/428,343

(22) Filed: Feb. 9, 2017

(65) Prior Publication Data

US 2017/0161864 A1 Jun. 8, 2017

Related U.S. Application Data

(63) Continuation of application No. 14/787,105, filed as application No. PCT/US2013/052862 on Jul. 31, 2013.

(51) Int. Cl.
*G06F 15/00* (2006.01)
*H04N 1/60* (2006.01)
(Continued)

(52) U.S. Cl.
CPC ....... *H04N 1/6019* (2013.01); *G03G 15/0863* (2013.01); *G06K 15/02* (2013.01); *H04N 1/00538* (2013.01)

(58) Field of Classification Search
None
See application file for complete search history.

(56) References Cited

U.S. PATENT DOCUMENTS 5,748,176 A 5/1998 Gondek
5,982,990 A 11/1999 Gondek
(Continued)

FOREIGN PATENT DOCUMENTS

CN 1716120 A 1/2006
JP 2005-269201 A 9/2005
(Continued)

OTHER PUBLICATIONS

Tanaka, M. et al.; "Data Compression for Digital Color Electrophotographic Printer with Evolvable Hardware"; Sep. 23-26, 1998; http://pdf.aminer.org/000/308/771/data_compression_for_digital_color_electrophotographic_printer_with_evolvable_hardware.pdf.
(Continued)

*Primary Examiner* — Helen Q Zong
(74) *Attorney, Agent, or Firm* — Fabian VanCott

(57) ABSTRACT

A printer cartridge includes a memory device and at least one compressed color table stored on the memory device. A compressed color table includes a losslessly compressed neutral axis, a number of nodes that correspond to seed color table nodes and a number of delta nodes that correspond to a number of delta tables. The number of delta tables indicate differences between interpolated color table nodes and corresponding actual color table nodes.

20 Claims, 6 Drawing Sheets

(51) Int. Cl.
*G03G 15/08* (2006.01)
*G06K 15/02* (2006.01)
*H04N 1/00* (2006.01)

(56) References Cited

U.S. PATENT DOCUMENTS

| | | | |
|---|---|---|---|
| 6,137,495 | A | 10/2000 | Gondek |
| 6,519,360 | B1 | 2/2003 | Tanaka |
| 6,559,982 | B1 | 5/2003 | Gondek |
| 6,693,726 | B2 | 2/2004 | Childs |
| 6,760,122 | B1 | 7/2004 | Gondek |
| 6,853,468 | B2 | 2/2005 | Miller |
| 6,972,868 | B1 | 12/2005 | Gondek |
| 6,992,783 | B1 | 1/2006 | Sumiuchi |
| 7,009,734 | B2 | 3/2006 | Suwa et al. |
| 7,034,968 | B2 | 4/2006 | Bhaskar |
| 7,221,473 | B2 | 5/2007 | Jeran et al. |
| 7,259,890 | B2 | 8/2007 | Jeran |
| 7,474,438 | B2 | 1/2009 | Gondek |
| 7,551,321 | B2 | 6/2009 | Jeran |
| 8,294,953 | B2 | 10/2012 | Shaw |
| 2002/0172431 | A1 | 11/2002 | Atkins |
| 2003/0025939 | A1 | 2/2003 | Jeran et al. |
| 2004/0252131 | A1 | 12/2004 | Gondek |
| 2005/0035984 | A1 | 2/2005 | Walmsley |
| 2005/0073731 | A1 | 4/2005 | Deer et al. |
| 2007/0080974 | A1 | 4/2007 | Edge et al. |
| 2007/0195342 | A1 | 8/2007 | Sugiura et al. |
| 2010/0085605 | A1 | 4/2010 | Shaw et al. |
| 2010/0220926 | A1 | 9/2010 | Monga et al. |
| 2011/0299128 | A1 | 12/2011 | Mestha |
| 2013/0003089 | A1 | 1/2013 | Morovic et al. |
| 2013/0093783 | A1 | 4/2013 | Sullivan |
| 2013/0121574 | A1 | 5/2013 | Malvar et al. |

FOREIGN PATENT DOCUMENTS

| | | |
|---|---|---|
| WO | WO-2006/081253 A2 | 8/2006 |
| WO | WO-2015016860 | 2/2015 |

OTHER PUBLICATIONS

Balaji, A. et al.; "Preprocessing Methods for Improved Lossless Compression of Color Look-Up Tables"; Journal of Imaging Science and Technology; Jul. 22, 2008; vol. 52; No. 4.

PRINTER CARTRIDGE AND MEMORY DEVICE CONTAINING A COMPRESSED COLOR TABLE

BACKGROUND

Many output devices such as ink printers and laser printers implement a subtractive color model while input devices such as computer monitors, mobile phones, and other input devices implement an additive color model. For example, output devices may use a CMYK (cyan, magenta, yellow and black) color model, while input devices may use a RGB (red, green and blue) color model. To output data from an input device such as a graphic, text or a combination thereof, output devices convert the additive color model into a subtractive color model.

BRIEF DESCRIPTION OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

Figure 1:
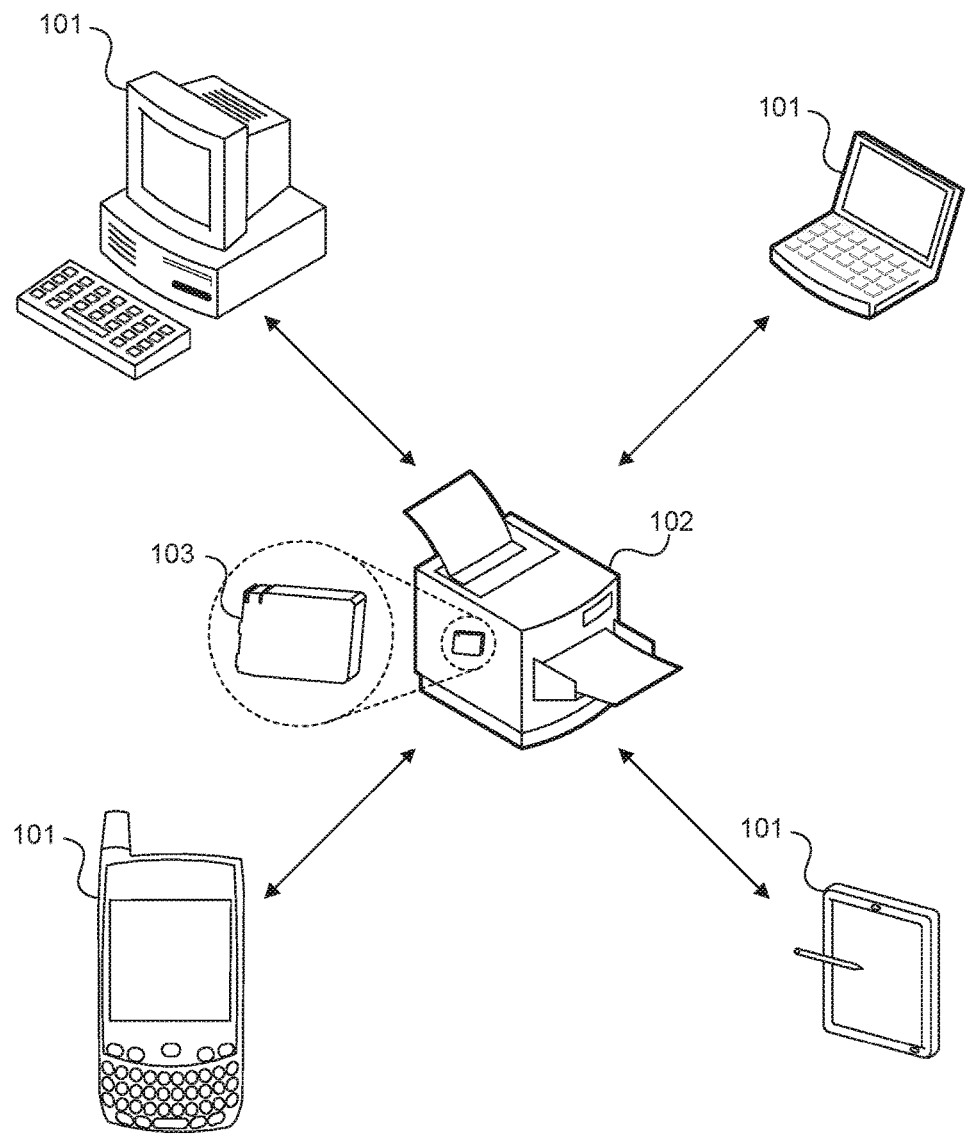
FIG. 1 is a diagram of input devices, an output device, and a printer cartridge, according to one example of the principles described herein.

Input devices may implement an additive color model to visually display text or images. For example, an input device may implement a RGB color model. An input device may implement various types of RGB color models. Examples of RGB color models include sRGB, Adobe® RGB and scan RGB. As used herein, the various types of RGB color models may be referred to generically as a RGB color model, or similar terminology.

Before an input image can be printed as a physical output, the input additive color model (RGB, for example) is converted to an output subtractive color model (CMYK, for example). This may be done using a color transformation table that converts RGB color data into CMYK color data.

However, current color transformation processes may produce unsatisfactory results. For example, often, the content of the color transformation from an additive model to a subtractive model is highly dependent on the output media formulation. For example, the color transformation may be dependent on fluid properties of the ink, the ink's reflective properties when printed on various substrates, and other inherent properties of the ink or toner. As a result, different cartridges, and different ink types may output different representations of input color. Additionally, the output device may rely on a number of color transform tables which can be large and take up valuable memory space.

Thus, the present disclosure describes a memory device, for example for use with, or disposed on a printer cartridge. The memory device contains a number of compressed color tables. While the attached description may refer to a single compressed color table, the memory device may contain a number of compressed color tables. A compressed color table comprises a losslessly compressed neutral axis. A number of nodes of the compressed color table correspond to a number of seed color table nodes. The compressed color table also comprises a number of delta nodes that correspond to delta values from a number of delta tables. The delta tables may indicate differences between interpolated color table nodes and corresponding actual color table nodes.

As described herein, the compressed color table stored on the memory device may allow for perceptually lossless compression of color tables at significant compression rates. Accordingly, the compressed color table may allow for lossy to lossless compression results while meeting the storage allocation of a memory device of a printer cartridge. In one example, the compressed color table preserves the neutral axis of the color table, which corresponds to those colors that are most susceptible to error perception by the human eye, thus increasing the overall quality of the compressed color table.

In one example, a memory device, that may be disposed on a printer cartridge, can be beneficial in that the color tables need not be disposed on a printer or other electronic device. The color table is optimized for the inks in the cartridge. For example, updates and adjustments to the color tables would not require pushing table updates via a printer program instruction or a printer driver update. Additionally, a memory device that comprises the compressed color table, affords greater flexibility and customization in the selection and use of various printer cartridges.

In the present specification and in the appended claims, the term "lossless compression," or similar language, may include compression wherein the original data, may be reconstructed from the compressed data, such that the differences between the original data and the compressed data are imperceptible. More specifically, "digitally lossless compression" may include compression where there will be no digital difference between the original data and the compressed data and "perceptually lossless compression" may include compression where there may be digital differences between the original data and the compressed data, but the differences may not be visible to the consumer of the data. The neutral axis and the seed color table may be digitally losslessly compressed. Additionally, in the present specification, the term "lossy compression," or similar language, may include compression wherein a portion of the original data is discarded during compression. As will be described below, the delta tables may be digitally lossless, perceptually lossless, or lossy.

Yet further, in the present specification and in the appended claims, the terms "seed color table," "intermediate color table," and "final color table" may include an initial, intermediate and final, or end-result, color table, respectively. In some examples, the seed color table may be a lower resolution color table, the intermediate color table may be a middle resolution color table, and the final color table may be a higher resolution color table. It should be noted that the final color table is different than the compressed color table. For example, the final color table is a high resolution color table that may not be compressed. By comparison, the compressed color table may be a high resolution color table that is compressed.

Yet further still, in the present specification and in the appended claims, the term "interpolated color table" or similar terminology may include a color table that comprises 1) a number of actual nodes that correspond to nodes from a lower resolution color table and 2) a number of interpolated nodes that are interpolated from the lower resolution color table using any mathematical interpolation method. The interpolated nodes may include interpolated node values.

By comparison, in the present specification, the term "seed/delta color table" or similar terminology may include a color table that comprises 1) a number of actual nodes that correspond to nodes from a lower resolution color table, 2) a number of delta nodes that are based on values from a delta table, the delta table reflecting differences between an actual color table and an interpolated version of the color table. From these differences node values may be reconstructed from the delta nodes during decompression.

Still further, in the present specification and in the appended claims, the term "neutral axis" may include a line extending from the origin of a three-dimensional color table to the node of the color table farthest from the origin. One of the origin node and the farthest node corresponds to the color white, and the other corresponds to the color black. Colors along the neutral axis may be referred to as "neutral colors," "near-neutral colors," or similar terminology and may be those colors where small differences or errors are most accurately discerned by the human eye. Accordingly, deviations along the neutral axis are more easily perceived by the human eye.

Lastly, as used in the present specification and in the appended claims, the term "a number of" or similar language may include any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

FIG. 1 is a diagram of input devices (101), an output device (102), and a printer cartridge (103), according to one example of the principles described herein. In some examples, via an input device (101) a user may generate data to be output in tangible form. The data may be text, an image, or combinations thereof. In one example of generating input to be physically output, a user may use a word processing computer program on a computer or laptop to generate a text document. In another example, a user may generate, or otherwise obtain a graphic. Examples of input devices (101) include, computers, laptops, digital cameras, mobile devices, personal digital assistants (PDAs), tablets, and other input devices. An output device (102) may be used to output a physical version of the generated data. For example, a printer may print the text document or the graphic onto paper. Examples of output devices (102) include, but are not limited to, laser printers and ink printers.

A printer cartridge (103) may be used with an output device (102) to generate a physical output based on information received from an input device (101). For example, the printer cartridge (103) may be an ink cartridge that contains liquid ink for use with an inkjet printer. In another example, the printer cartridge (103) may be a toner cartridge that contains dry toner powder for use with a laser printer. As will be described below, the printer cartridge (103) may comprise a number of compressed color tables that convert an input device (101) color model to an output device (102) color model.

In some examples, a number of printer cartridges (103) may be used with an output device (102) to generate an output. For example, when used with an inkjet printer, multiple printer cartridges (103) may be used. More specifically, one printer cartridge (103) may include black ink and another printer cartridge (103) may include cyan, magenta and yellow ink. In another example, one printer cartridge (103) may include black ink, another printer cartridge (103) may include cyan ink, another printer cartridge (103) may include magenta ink, and another printer cartridge (103) may include yellow ink. Accordingly, each printer cartridge (103) may contain a number of compressed color tables corresponding to the ink colors included in the printer cartridge (103). While FIG. 1 depicts a number of input devices (101), and an output device (102), the present specification is directed to a printer cartridge (103). Specifically, the present specification is directed to a printer cartridge (103) and memory device containing a compressed color table.

Figure 2:
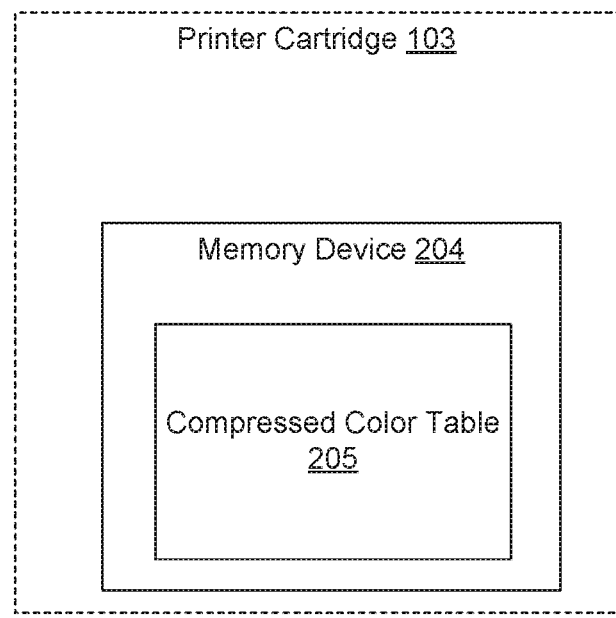
FIG. 2 is a diagram of a memory device containing a compressed color table, according to one example of the principles described herein.

FIG. 2 is a diagram of a memory device (204) containing a compressed color table (205), according to one example of the principles described herein. The memory device (204) may store data relating to the conversion of input data to output data. For example, the memory device (204) may store a number of compressed color tables (205) that convert an input color model into an output color model. The memory device (204) may be implemented with other electronic components to generate a physical output. For example, the memory device (204) may be coupled to a printer cartridge controller (not shown) that controls the distribution of an output media (e.g., ink or toner) onto a physical substrate. In some examples, a memory device (204) may be disposed on the printer cartridge (103). In other examples, the memory device (204) may be independent of the printer cartridge (103) and programmed to be used with the printer cartridge (103).

As described above, the memory device (204) may store a number of compressed color tables (205) that transform received data from an input color model to an output color model. More specifically, a compressed color table (205) may specify the transformations of an input RGB model (such as sRGB, adobe RGB, scan RGB, for example) to an output CMYK model. While the present specification discusses the color transformation with regards to a three-dimensional RGB color model, the compressed color tables (205) may convert any number, and any type, of input color models into any number, and any type, of output color models. Examples of color models that may be converted include, but are not limited to, the Specifications for Web Offset Publications (SWOP) CMYK model, and the International Commission on Illumination (CIE) L*a*b* color model.

As will be described in more detail in connection with FIG. 3, the compressed color table (205) may be represented by a three-dimensional cube having a number of nodes. The nodes may indicate output colorant amounts. In this representation, the compressed color table (205) may include a losslessly compressed neutral axis, a number of nodes corresponding to nodes of a seed color table and a number of delta nodes that correspond to a number of delta tables, the delta tables indicating differences between corresponding nodes on an interpolated color table and an actual color table.

Storing the compressed color table (205) on a memory device (204) either used with, or disposed on, a printer cartridge (103) may be beneficial in that it allows greater flexibility in output media customization. For example, updates to the color transformation may be distributed via the printer cartridges (103) as opposed to pushing printer program instructions or printer driver updates. Additionally, as the color transformation is heavily dependent on the ink or toner formulation, a more accurate representation of the input color model may be generated when the compressed color table (205) is stored on, and tailored to, a specific printer cartridge (103) rather than stored on an output device (FIG. 1, 102) that may implement various kinds of printer cartridges (103). Additionally, compressed color tables (205) may be updated as ink or toner formulation changes.

Figure 3:
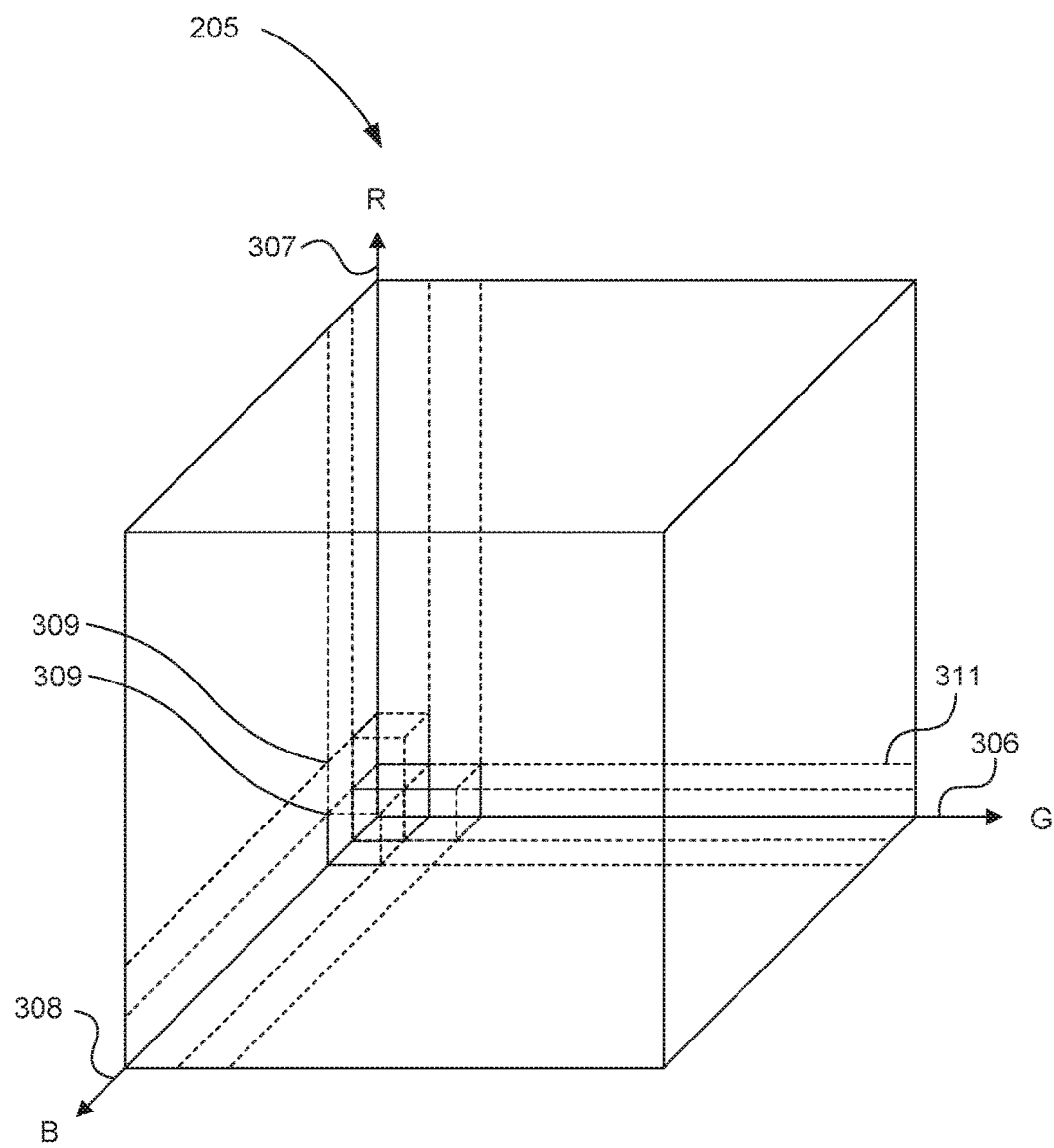
FIG. 3 is a diagram of a compressed color table, according to one example of the principles described herein.

FIG. 3 is a diagram of a compressed color table (205), according to one example of the principles described herein. As described above, in some examples, the compressed color table (205) may be represented as a three-dimensional cube. Each axis of the cube may correspond to a color of the input color model. For example, the x-axis (306) may correspond to the color green, the y-axis (307) may correspond to the color red, and the z-axis (308) may correspond to the color blue. A number of lines may divide each plane of the cube as indicated in FIG. 2 by the dashed lines. For simplicity, in FIG. 3, just a single line has been indicated by a reference numeral. The intersection of two lines is designated as a node (309) that indicates a transformation from the input colorant indicated by the index of the node (309) in the cube, to an output colorant indicated by a node value. More specifically, each node (309) is indexed by the input color model colorants (e.g., R,G,B as depicted in FIG. 3) and a node value indicates the output colorant combination that generates an output colorant corresponding to the input colorant for that node (309).

In general, a color table may be defined by the number of nodes along a particular axis. For example, a color table with five nodes along each axis may be referred to as a 5-cubed color table. By comparison, a color table with seventeen nodes along each axis may be referred to as a 17-cubed color table. The accuracy of the color transformation depends on the number of nodes of the color table. In some examples, the accuracy of the color transformation may be referred to as the resolution of the color table. For example, a 5-cubed color table generates a less accurate output representation of the input color model. This may also be referred to as a low-resolution color table. By comparison, a 17-cubed color table generates a more accurate output representation of the input color mode. This may be referred to as a high-resolution color table.

In some examples, the compressed color table (205) may be a high resolution color table. For example, the compressed color table (205) may consist of seventeen nodes (309) along each axis (306, 307, 308) of the cube. In another example, the compressed color table (205) may be a multi-resolution color table. More specifically, a number of nodes (309) may have an intermediate resolution, and a number of other nodes (309) may have a high resolution. For example, differences in vivid colors are less easily perceived by the human eye. Accordingly, nodes (309) corresponding to these vivid colors may have an intermediate resolution. By comparison, differences in "near-neutral" colors (i.e., colors close to a neutral axis of the cube) are more easily perceived by the human eye. Accordingly, nodes (309) corresponding to these near-neutral colors may have a higher resolution.

The compressed color table (205) may correspond to a particular media type. For example, particular paper types, or particular paper colors may have corresponding compressed color tables (205). For example, one compressed color table (205) may correspond to plain paper and another compressed color table (205) may correspond to thicker paper, such as company letterhead, or bond paper. In another example, different degrees of output quality may have different compressed color tables (205). For example, a "draft" quality may have one compressed color table (205), and a "best" quality may have a different compressed color table (205). In yet another example, different input devices (FIG. 1, 101) may have different corresponding compressed color tables (205). For example, a mobile device may have one corresponding compressed color table (205), and a digital camera may have a different corresponding compressed color table (205).

A number of the nodes (309) of the compressed color table (205) may correspond to nodes of a seed color table. The seed color table may be a lower-resolution, and distinct, version of the compressed color table (205). For example, the compressed color table (205) may be a 17-cubed color table and the seed color table may be a 5-cubed color table.

A number of other nodes (309) of the compressed color table (205) may be delta nodes that correspond to a number of delta tables. An example of delta nodes is given as follows. According to an example, a seed color table may be a low resolution version of the compressed color table (205). For example, the seed color table may be a 5-cubed table. From this seed color table, an intermediate color table (a 9-cubed table, for example) may be interpolated using linear interpolation, tetrahedral interpolation, or any other type of interpolation. Interpolation may include generating a number of nodes unique to the intermediate color table. For example, a number of unique nodes may be interpolated by further dividing the planes of the seed color table. Accordingly, the interpolated intermediate color table may include 1) a number of nodes that correspond to the seed color table nodes and 2) a number of nodes that have been interpolated from the seed color table. The number of nodes that have been interpolated may be unique to the interpolated intermediate color table.

Regarding the nodes that are unique to the interpolated intermediate color table, the interpolated node values may be compared to node values of an actual (and not interpolated) intermediate color table, and the differences or "deltas" stored in a first delta table. From the first delta table and the seed color table, an intermediate "seed/delta" color table may be generated. As described above, the intermediate "seed/delta" color table may include 1) a number of nodes that correspond to the seed color table nodes and 2) a number of delta nodes that correspond to the first delta table.

The intermediate "seed/delta" color table may be different from the interpolated intermediate color table in that the interpolated intermediate color table includes a number of interpolated nodes while the intermediate "seed/delta" color table includes a number of delta nodes. The interpolated nodes including an interpolated node value and the delta nodes including a corresponding difference from the first delta table.

From this intermediate "seed/delta" color table, a final color table (a 17-cubed table, for example) may be interpolated using linear interpolation, tetrahedral interpolation, or any other type of interpolation. Interpolation may include generating a number of nodes unique to the final color table.

For example, a number of unique nodes may be interpolated by further dividing the planes of the intermediate color table (the 9-cubed color table). As such, the interpolated final color table may include 1) a number of nodes that correspond to the seed color table nodes, 2) a number of nodes that correspond to the intermediate seed/delta color table and 3) a number of nodes that have been interpolated from the intermediate "seed/delta" color table. The number of nodes that have been interpolated may be unique to the interpolated final color table.

Regarding the nodes that are unique to the interpolated final color table, the interpolated final node values may be compared to node values of an actual (and not interpolated) final color table, and the differences or "deltas" stored in a second delta table. From the first delta table, the second delta table, and the seed color table, a compressed color table (205) may be generated. As described above, the compressed color table (205) may include 1) a number of nodes that correspond to the seed color table nodes, 2) a number of delta nodes that correspond to the number of delta tables. More specifically, the compressed color table (205) may include nodes corresponding to 1) the seed color table, 2) the first delta table indicating differences between an interpolated intermediate color table and an actual intermediate color table for those nodes in the intermediate color table and not the seed color table, and 3) the second delta table indicating differences between an interpolated final color table and an actual final color table for those nodes in the final color table and not the intermediate color table.

The compressed color table (205) may be different from the interpolated final color table in that the interpolated final color table includes a number of interpolated nodes while the compressed color table (205) includes a number of delta nodes. The interpolated nodes including an interpolated node value and the delta nodes including a value corresponding to a delta value from the second delta table.

The compressed color table (205) has a first level of compression by using the differences from the delta tables instead of actual colorant amounts for a number of nodes (309). The compressed color table (205) may have been further compressed by reducing a number of values in the delta tables. As described above, delta values may indicate the difference between an actual node value and an interpolated node value. In some examples, delta values may be reduced. For example, each delta value may be judged and potentially reduced based on colorimetry, perception, or a combination thereof. More specifically, each output colorant at each node, with its given delta, can be analyzed and a lower delta value in the delta table (a delta value closer to, or equal to zero, for example) can be assigned where the color difference is perceptually insignificant. An output colorant value for a node may be assigned that results in a lower delta value. For example, a colorant value (or amount) that gives a lower delta value may be greater or smaller than the default colorant value. In another example, the reduced values may be based on memory device (FIG. 2, 204) characteristics. For example, least significant deltas (i.e., those pertaining to colors that are least susceptible to difference detection) may be reduced (to zero, for example), until the compressed color table (205) is a size that complies with the storage capabilities of the memory device (FIG. 2, 204).

Reduced delta values in the delta tables of the compressed color table (205) further decreases the size of the compressed color table (205) and allows the compressed color table (205) to be stored on small storage devices, such as the memory device (FIG. 2, 204) implemented alone, or disposed on, a printer cartridge (FIG. 1, 103).

A second level of compression is exhibited by the compressed color table (205) by representing a string of zero value entries in the delta tables as a length. For example, the first delta table and the second delta table may have significant repeating runs of zero delta entries. To efficiently represent data that will have many repeating zero entries, a most significant bit may indicate the beginning of a string of zero value entries. If that bit is set, the remaining bits define the number of zero delta entries. Representing a string of zero value entries may be understood as run length encoding. Representing a string of zero value entries with a most significant bit and remaining bits that indicate the string length may be beneficial in that it creates a distribution of data with low entropy that further compresses the compressed color table (205).

Another level of compression may be exhibited by the compressed color table (205) by delta tables that have been ordered in a way to improve compression. In a color table, the low chromatic input colors are more likely to generate non-zero entries in a delta table. By comparison, high chromatic input colors are more likely to generate low, or zero, delta table values. Accordingly, a delta table may be ordered from least chromatic to most chromatic color input. In such a delta table, entries that are most likely to be non-zero (the least chromatic colors) are grouped, and the entries that are most likely to have low or zero delta values (the most chromatic colors) are also grouped together. A delta table as described may have increased strings of zero value entries. A delta table that is arranged according to chromatic properties of the input colors may be beneficial in that it increases the size of zero-value runs and therefore is further compressed and has lower data entropy. While a delta table ordering based on chromatic color properties has been described, many other delta table orderings may be used. The particular delta table ordering may be based on ink properties or color table properties.

The reduced size, allows for the compressed color table (205) to be stored on the memory device (204), which as described is beneficial in that it allows for greater flexibility and customization in adjusting the color mappings. Additionally, a compressed color table (205) that comprises a number of nodes (309) that correspond to nodes of a seed color table increases the quality of the compressed color table (205) as the seed color table is less subject to entropy, thus increasing the compression amount of the compressed color table (205). It should be noted, that while 5-cubed, 9-cubed and 17-cubed versions of a color table have been indicated as seed, intermediate and final resolution values, any number and any resolution color table may be implemented as described above.

Figure 4:
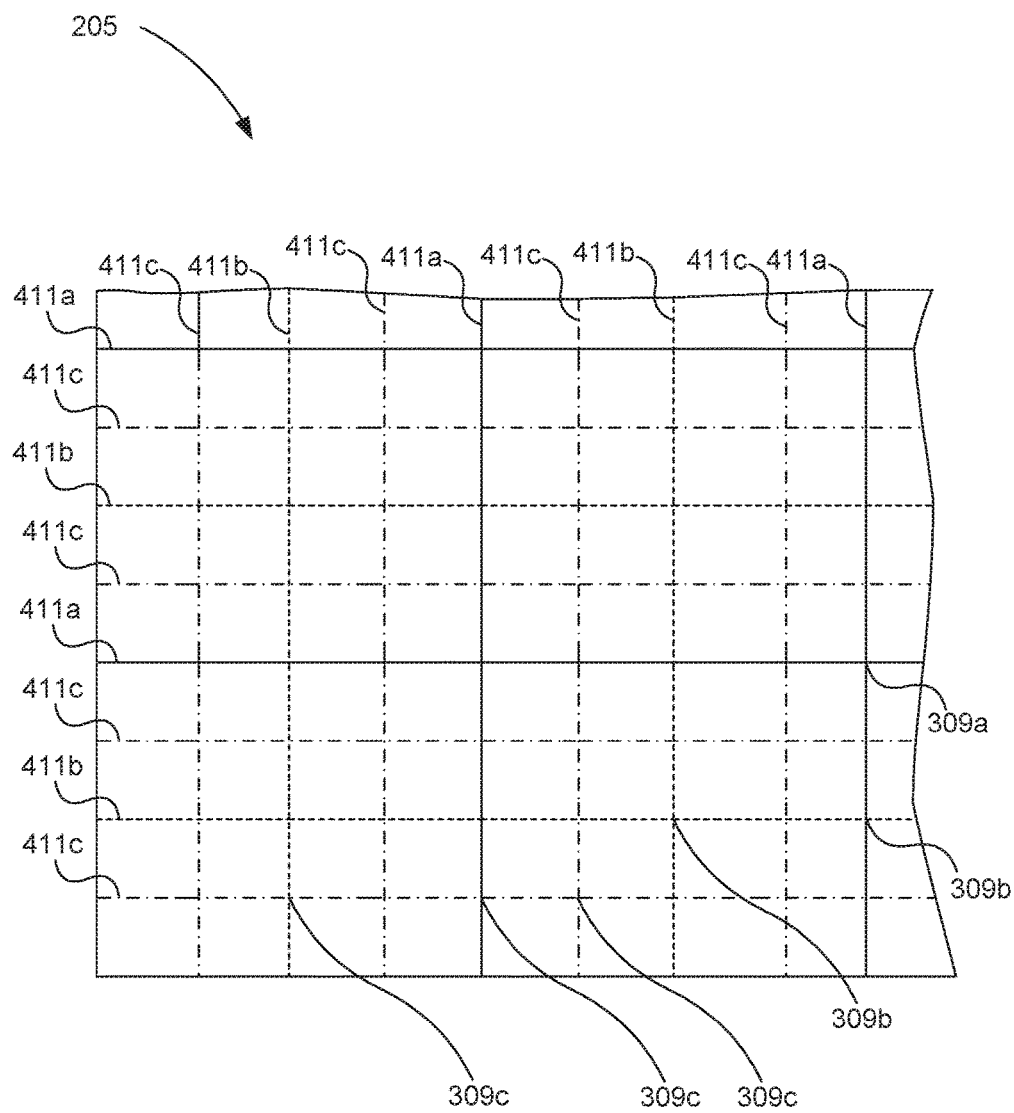
FIG. 4 is a diagram of a compressed color table, according to one example of the principles described herein.

FIG. 4 is a diagram of a compressed color table (205), according to one example of the principles described herein. More specifically, a portion of the compressed color table (205) is depicted in FIG. 4. FIG. 4 depicts those nodes (309a) of the compressed color table (205) that correspond to the seed color table, those nodes (309b) that correspond to the first delta table, and those nodes (309c) that correspond to the second delta table. As described above, a number of lines (411) may divide a color table into a number of nodes (309) and a color table may be defined by the number of nodes (309) along each axis of the color table. For example, in FIG. 4, a first set of lines (411a), indicated as solid lines, may divide each axis of a color table into 5 nodes, resulting in a 5-cubed table. The intersection of two lines (411a) of the first set results in a first set of nodes (309a) that correspond to the seed color table. For simplicity, in FIG. 4, just one of the first set of nodes (309a) is indicated by a reference numeral; however each intersection of lines (411a) of the first set results in a node (309a) of the first set. As described above, the compressed color table (205) may include a number of nodes (309a) that correspond to the seed color table. In the compressed color table (205) the node values for these nodes (309a) may be the output colorant amount.

As described above, a lower resolution color table may be used to interpolate a higher resolution color table. For example, additional lines (411b), indicated as dashed lines, may further divide each axis of the color table. The intersection of a line (411b) of the second set with a line of the first set (411a) or a line of the second set (411b) may result in a second set of nodes (309b) that correspond to nodes based on the first delta table.

Similarly, additional lines (411c) indicated as dash-dot lines, may yet further divide each axis of the color table. The intersection of a line (411c) of the third set with any other line (411a, 411b, 411c) may result in a third set of nodes (309c) that correspond to nodes based on the second delta table. Accordingly, the nodes of the compressed color table (205) may include nodes (309a) that correspond to the seed color table, nodes (309b) that correspond to the first delta table, and nodes (309c) that correspond to the second delta table.

Figure 5:
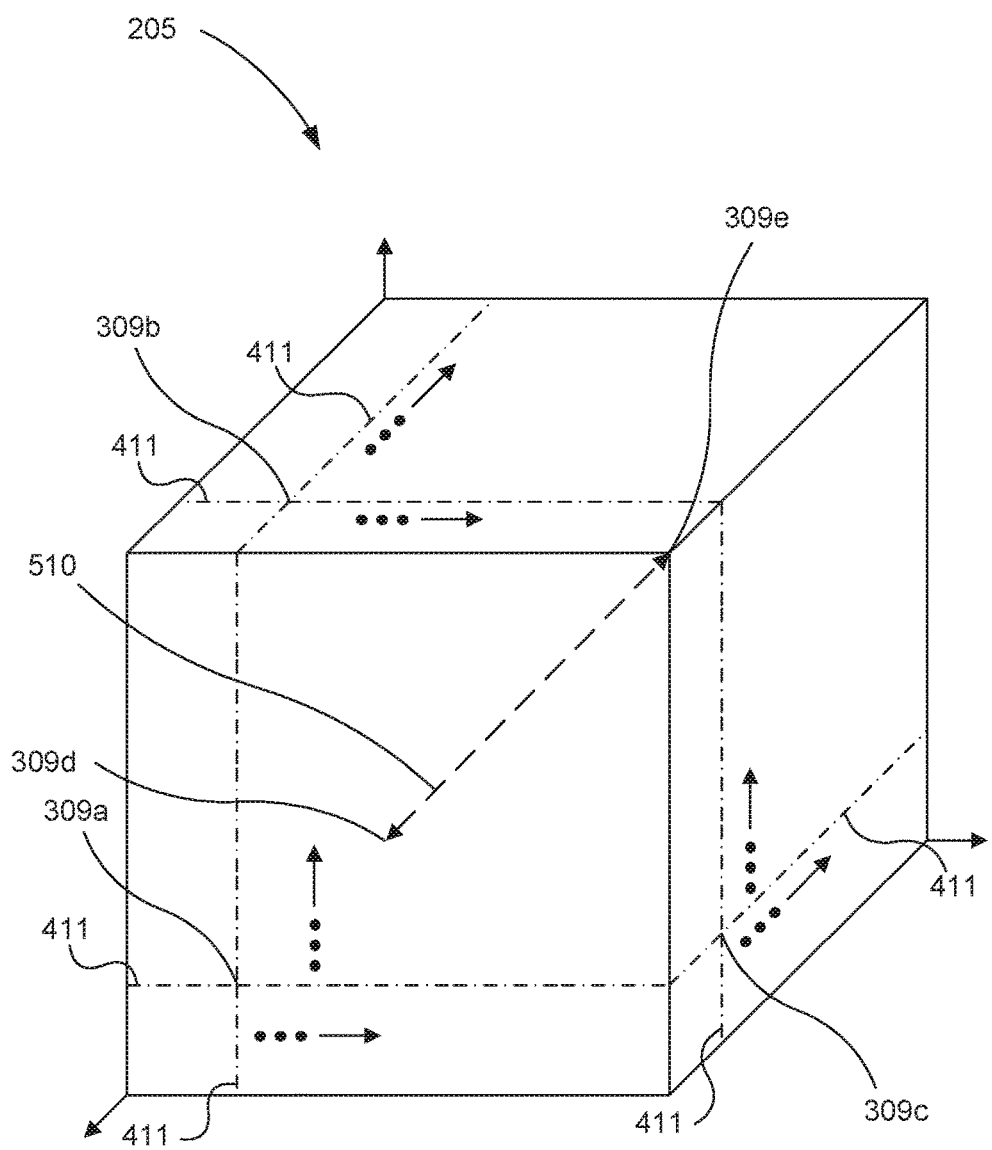
FIG. 5 is another diagram of a compressed color table, according to one example of the principles described herein.

FIG. 5 is an example of a compressed color table (205), according to one example of the principles described herein. As described above, the compressed color table (205) may be divided by a number of lines (411) that result in a number of nodes (309) of the compressed color table (205). For simplicity, just a few lines (411) and nodes (309) have been indicated on FIG. 5 with reference numerals. In some examples, the compressed color table (205) may be a high-resolution color table. In other words, the compressed color table (205) may include 17 nodes along each axis. It should be noted that while 17 nodes is indicated as high resolution, any number of nodes along an axis may indicate high resolution. For example, 33 nodes may indicate a color table is a full-resolution color table.

The compressed color table (205) also comprises a losslessly compressed neutral axis (510). More specifically, the losslessly compressed neutral axis (510) may be digitally lossless, which as described above, is a compression process in which no data is lost. Accordingly, the losslessly compressed neutral axis (510) may be a full-resolution neutral axis (510). As described above, changes to colors that fall along the neutral axis (510) are more easily detected by the human eye. Accordingly, it may be desirable to increase the resolution along the neutral axis (510) to increase the accuracy, or overall quality, of the compressed color table (205). In some examples, one of the origin node (309d), or the node (309e) farthest from the origin node (309d), represents the color black, while the other represents the color white. Including a losslessly compressed, or full resolution, neutral axis (510) is beneficial in that it enhances the accuracy of the color transformation, as it increases the resolution for those nodes (309) that are most likely to be noticed if they are different.

Figure 6:
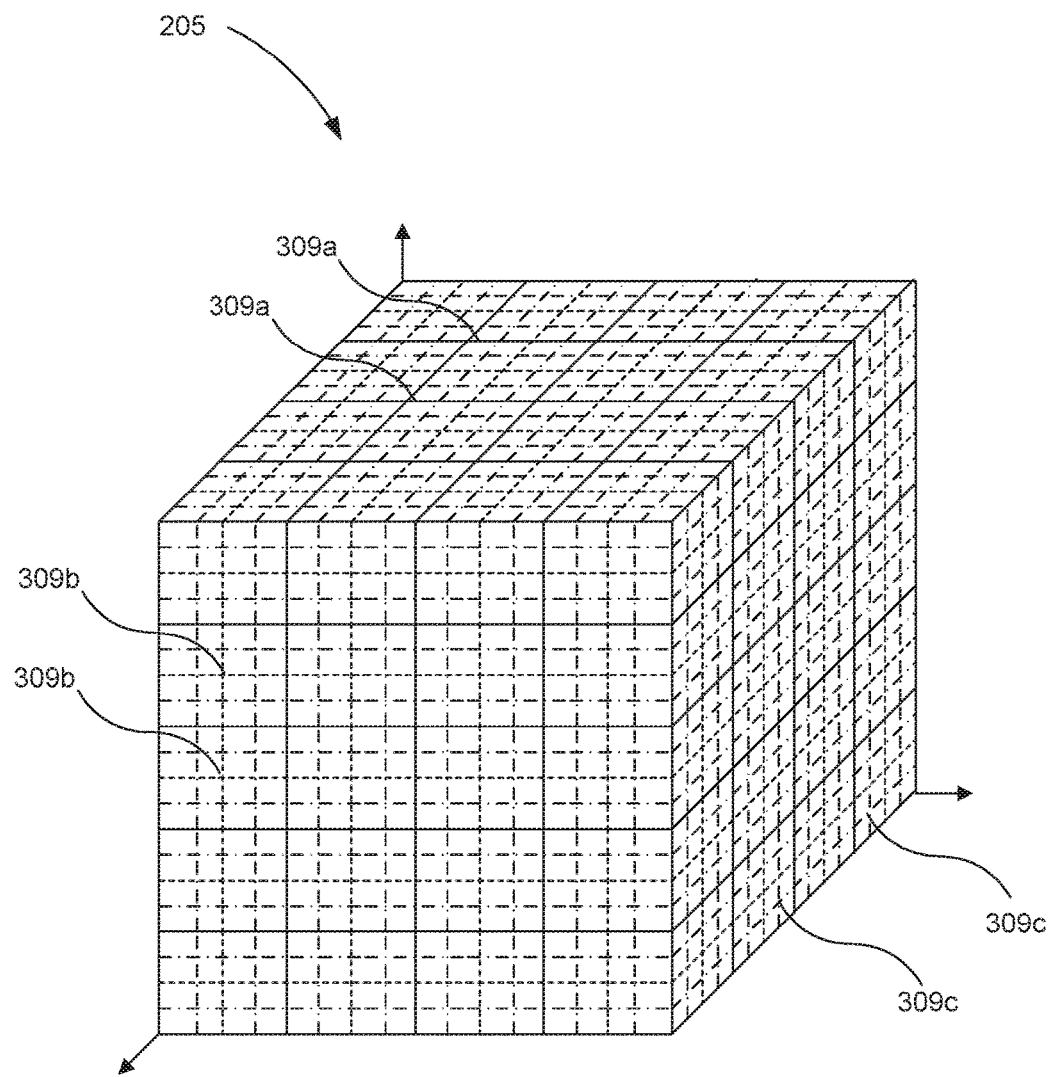
FIG. 6 is another diagram of a compressed color table, according to one example of the principles described herein.

FIG. 6 is an example of a compressed color table (205), according to one example of the principles described herein. As described above, the compressed color table (205) may include a number of nodes (309a) that correspond to the seed color table. In FIG. 6, in addition to those nodes (309a) indicated, the intersection of two solid lines indicates nodes that correspond to seed color table nodes.

Additionally, the compressed color table (205) includes nodes (309b) that correspond to a number of delta tables. In other words, nodes that do not exist in the seed color table and do not exist in the losslessly compressed neutral axis (FIG. 1, 510). In FIG. 6, in addition to those nodes (309b) indicated, the intersection of a dashed line with a solid line or another dashed line indicates nodes (309b) that are based on a first delta table. In FIG. 6, in addition to those nodes (309c) indicated, the intersection of a dash-dot line with any other line (solid line, dashed line, or a dash-dot line) indicates nodes (309c) that are based on a second data table.

The compressed color table (205) may also have been compressed using a traditional compression encoding scheme such as Lempel-Ziv-Welch (lzw) compression, Lempel-Ziv-Markov chain algorithm (lzma) compression, gzip, or other compression techniques.

A compressed data table (205) that comprises a number of nodes (309) that indicate the difference between an interpolated value and an actual value (i.e., the delta tables) may be beneficial in that the size of the compressed data table (205) is reduced as just the differences are stored, rather than the actual amount of output colorant. One example of the compression rates for the compressed color table (205) is given in Table 1. Table 1 indicates the compression results for an example ink set, for printing on plain paper.

TABLE 1

| Compression Level | Original Size (bytes) | Run length Encoding | Run Length Encoding with lzma Compression | Compression Ratio |
| --- | --- | --- | --- | --- |
| 0 (lossless) | 19652 | 10201 | 5207 | 3.8:1 |
| 1 | 19652 | 6134 | 3573 | 5.5:1 |
| 2 | 19652 | 4511 | 2807 | 7.0:1 |
| 3 | 19652 | 3550 | 2312 | 8.6:1 |
| 4 | 19652 | 2911 | 1965 | 10.1:1 |
| 5 | 19652 | 1936 | 1310 | 14.7:1 |
| 6 | 19652 | 1387 | 938 | 19.9:1 |
| 7 (no deltas) | 19652 | 700 | 435 | 45.2:1 |

In Table 1, level 0 is a lossless compression. In other words there is no difference between the reconstructed data and the original data. At level 7, the first delta table and the second delta table are discarded.

The specification and figures describe a printer cartridge (FIG. 1, 103) comprising a memory device (FIG. 2, 204) that contains a number of compressed color tables (FIG. 2, 205). The compressed color tables (FIG. 2, 205) comprise a losslessly compressed neutral axis (FIG. 5, 510), a number of nodes (FIG. 3, 309) that correspond to seed color table nodes and a number of delta nodes (FIG. 3, 309) that are based on a number of delta tables. The delta tables indicate differences between interpolated color table nodes and corresponding actual color table nodes.

A memory device (FIG. 2, 204) for use in a printer cartridge (FIG. 1, 103) is described. The memory device (FIG. 2, 204) contains a number of compressed color tables (FIG. 2, 205). The compressed color tables (FIG. 2, 205) comprise a losslessly compressed neutral axis (FIG. 5, 510), a number of nodes (FIG. 3, 309) that correspond to seed color table nodes and a number of delta nodes (FIG. 3, 309) that correspond to a number of delta tables. The delta tables indicate differences between interpolated color table nodes and corresponding actual color table nodes.

A compressed color table (FIG. 2, 205) stored on a memory device (FIG. 2, 204) that is either programmed to be used with, or disposed on a printer cartridge (FIG. 1, 103)

may have a number of advantages, including: (1) offering improved ink types that didn't exist at the time the original product was manufactured; (2) correcting color tables in printers after start of manufacturing of an output device (FIG. 1, 102); (5) correcting color tables for changes in media; and (6) supporting media types that didn't exist at the time an output device (FIG. 1, 102) was manufactured. Additionally, a compressed color table (FIG. 2, 205) that comprises a seed color table and a number of delta tables may have a number of advantages, including: (1) introducing output media with different color characteristics without requiring the customer to replace all supplies to correct for errors; and (2) introducing improved color tables for a single color without requiring the customer to replace all supplies to correct for errors.

The preceding description has been presented to illustrate and describe examples of the principles described. This description is not intended to be exhaustive or to limit these principles to any precise form disclosed. Many modifications and variations are possible in light of the above teaching.

What is claimed is:

1. A memory device configured for physical attachment to printer cartridge, the memory device comprising:
   a memory programmed to output data from at least one compressed color table, comprising:
   a losslessly compressed neutral axis;
   a number of nodes that correspond to seed color table nodes; and
   a number of delta nodes that correspond to a number of delta tables;
   in which the number of delta tables indicate differences between interpolated color table nodes and corresponding actual color table nodes; and
   an output to provide the output data to a host device in which the printer cartridge will be installed.

2. The memory device of claim 1, in which:
   a first delta table indicates a difference between an interpolated intermediate color table and an actual intermediate color table; and
   a second delta table indicates a difference between an interpolated final color table and an actual final color table.

3. The memory device of claim 2, in which the first delta table, the second delta table, or a combination thereof include a number of reduced delta values.

4. The memory device of claim 3, in which the reduced delta values comprise values reduced based on colorimetry, perception, or a combination thereof.

5. The memory device of claim 2, in which the first delta table, the second delta table, or a combination thereof comprise a representation of a string of zero delta values as a length of the string.

6. The memory device of claim 2, in which the first delta table, the second delta table, or a combination thereof have been arranged based on properties of an input color model.

7. The printer cartridge of claim 6, in which the first delta table, the second delta table, or a combination thereof have been arranged such that input colors with low chromatic properties are grouped together, and input colors with high chromatic properties are grouped together.

8. The memory device of claim 1, in which the compressed color table is based on the memory device characteristics.

9. The memory device of claim 1, in which the compressed color table includes nodes of different resolution.

10. A memory device, comprising:
    a physical interface for attaching the memory device to a printer cartridge; and
    a memory, the memory programmed for use with the printer cartridge including an electronic interface for providing at least one compressed color table that is used during ejection of ink from the printer cartridge, the compressed color table, comprising:
    a losslessly compressed neutral axis;
    a number of nodes that correspond to seed color table nodes; and
    a number of delta nodes that correspond to a number of delta tables;
    in which:
    the number of delta tables indicate differences between interpolated color table nodes and corresponding actual color table nodes; and
    the at least one compressed color table is used during ejection of ink from an ink reservoir.

11. The memory device of claim 10, in which the compressed color table is specific to a printer cartridge to which the memory device corresponds.

12. The memory device of claim 10, in which the compressed color table corresponds to a particular media type.

13. The memory device of claim 10, in which the compressed color table corresponds to a particular output quality.

14. The memory device of claim 10, in which the number of delta nodes comprises a first number of delta nodes that indicate differences between an interpolated intermediate color table and an actual intermediate color table.

15. The memory device of claim 14, in which the number of delta nodes comprises a second number of delta nodes that indicate differences between an interpolated final color table and an actual final color table.

16. The memory device of claim 10, in which the memory device is coupled to a print cartridge controller.

17. A memory system, comprising:
    a memory device comprising:
    at least one compressed color table, comprising:
    a losslessly compressed neutral axis;
    a number of nodes that correspond to seed color table nodes; and
    a number of delta nodes that correspond to a number of delta tables;
    in which:
    the number of delta tables indicate differences between interpolated color table nodes and corresponding actual color table nodes; and
    the at least one compressed color table is used during ejection of ink from an ink reservoir; and
    a print cartridge controller to control a distribution of the ink onto a substrate.

18. The memory system of claim 17, wherein the compressed color table is based on the memory device characteristics.

19. The memory system of claim 17, wherein the at least one compressed color table is tailored to a print cartridge on which the memory device and the print cartridge controller are disposed.

20. The memory system of claim 17, in which:
    a first delta table indicates a difference between an interpolated intermediate color table and an actual intermediate color table; and
    a second delta table indicates a difference between an interpolated final color table and an actual final color table.

* * * * *

UNITED STATES PATENT AND TRADEMARK OFFICE
CERTIFICATE OF CORRECTION

PATENT NO. : 9,800,764 B2
APPLICATION NO. : 15/428343
DATED : October 24, 2017
INVENTOR(S) : Jay S. Gondek et al.

Page 1 of 1

It is certified that error appears in the above-identified patent and that said Letters Patent is hereby corrected as shown below:

In the Claims

In Column 11, Line 23, in Claim 1, delete "to" and insert -- to a --, therefor.

Signed and Sealed this
Twentieth Day of March, 2018

Andrei Iancu
*Director of the United States Patent and Trademark Office*